US011562328B1

(12) United States Patent
Jiang et al.

(10) Patent No.: US 11,562,328 B1
(45) Date of Patent: Jan. 24, 2023

(54) SYSTEMS AND METHODS FOR RECOMMENDING JOB POSTINGS

(71) Applicant: Meta Platforms, Inc., Menlo Park, CA (US)

(72) Inventors: Wenzhe Jiang, Seattle, WA (US); Jinyi Yao, Issaquah, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 197 days.

(21) Appl. No.: 16/232,694

(22) Filed: Dec. 26, 2018

(51) Int. Cl.
*G06Q 10/10* (2012.01)
*G06F 16/9535* (2019.01)
*G06N 20/00* (2019.01)

(52) U.S. Cl.
CPC ..... *G06Q 10/1053* (2013.01); *G06F 16/9535* (2019.01); *G06N 20/00* (2019.01)

(58) Field of Classification Search
CPC ..... G06Q 10/1053; G06Q 50/01; G06N 20/00
See application file for complete search history.

(56) References Cited

U.S. PATENT DOCUMENTS

| 2015/0227891 | A1* | 8/2015 | Cohen | G06Q 10/1053 705/321 |
| 2018/0039944 | A1* | 2/2018 | Wang | G06Q 10/1053 |
| 2018/0285730 | A1* | 10/2018 | Zhao | G06N 5/022 |
| 2018/0336241 | A1* | 11/2018 | Noh | G06F 16/958 |
| 2020/0005134 | A1* | 1/2020 | Ramanath | G06N 5/003 |
| 2020/0097560 | A1* | 3/2020 | Kulkarni | G06Q 30/0201 |
| 2020/0134398 | A1* | 4/2020 | Kruk | G06K 9/6292 |
| 2020/0202303 | A1* | 6/2020 | Zhang | G06F 16/29 |

OTHER PUBLICATIONS

Zhou, Guorui, et al. "Deep interest network for click-through rate prediction." Proceedings of the 24th ACM SIGKDD international conference on knowledge discovery & data mining. 2018. (Year: 2018).*

\* cited by examiner

*Primary Examiner* — Andrew B Whitaker
*Assistant Examiner* — Brendan S O'Shea
(74) *Attorney, Agent, or Firm* — Sheppard Mullin Richter & Hampton LLP

(57) ABSTRACT

Systems, methods, and non-transitory computer-readable media can determine a user embedding for a user of a content provider based on one or more machine learning models. A job embedding for a job posting published through the content provider can be determined based on one or more machine learning models. A determination can be made of a threshold level of similarity between the user embedding and the job embedding. The job posting can be provided as a recommendation to the user through the content provider.

20 Claims, 8 Drawing Sheets

SYSTEMS AND METHODS FOR RECOMMENDING JOB POSTINGS

FIELD OF THE INVENTION

The present technology relates to the field of machine learning technology. More particularly, the present technology relates to techniques for recommending job postings based on machine learning models.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others.

SUMMARY

Various embodiments of the present technology can include systems, methods, and non-transitory computer readable media configured to determine a user embedding for a user of a content provider based on one or more machine learning models. A job embedding for a job posting published through the content provider can be determined based on one or more machine learning models. A determination can be made of a threshold level of similarity between the user embedding and the job embedding. The job posting can be provided as a recommendation to the user through the content provider.

In an embodiment, the user embedding for the user comprises at least a first portion corresponding to a text embedding, a second portion corresponding to a media embedding, and a third portion corresponding to a dense data embedding.

In an embodiment, the text embedding is determined based at least in part on text included in a user profile of the user, text included in content that was accessed by the user, or both.

In an embodiment, the media embedding is determined based at least in part on media included in a user profile of the user, media included in content that was accessed by the user, or both.

In an embodiment, the dense data embedding is determined based at least in part on a set of identifiers corresponding to content items that were sequentially accessed by the user over one or more sessions.

In an embodiment, the job embedding for the user comprises at least a first portion corresponding to a text embedding, a second portion corresponding to a media embedding, and a third portion corresponding to a dense data embedding.

In an embodiment, the text embedding is determined based at least in part on text included in the job posting.

In an embodiment, the media embedding is determined based at least in part on media included in the job posting.

In an embodiment, the dense data embedding is determined based at least in part on a number of times the job posting was accessed by users, a number of times the job posting was shared by users, and a number of users that have applied to the job posting.

In an embodiment, determining the threshold level of similarity between the user embedding and the job embedding further causes the systems, methods, and non-transitory computer readable media to determine a similarity score based on a dot product of the user embedding and the job embedding and determine that the similarity score satisfies a threshold value.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
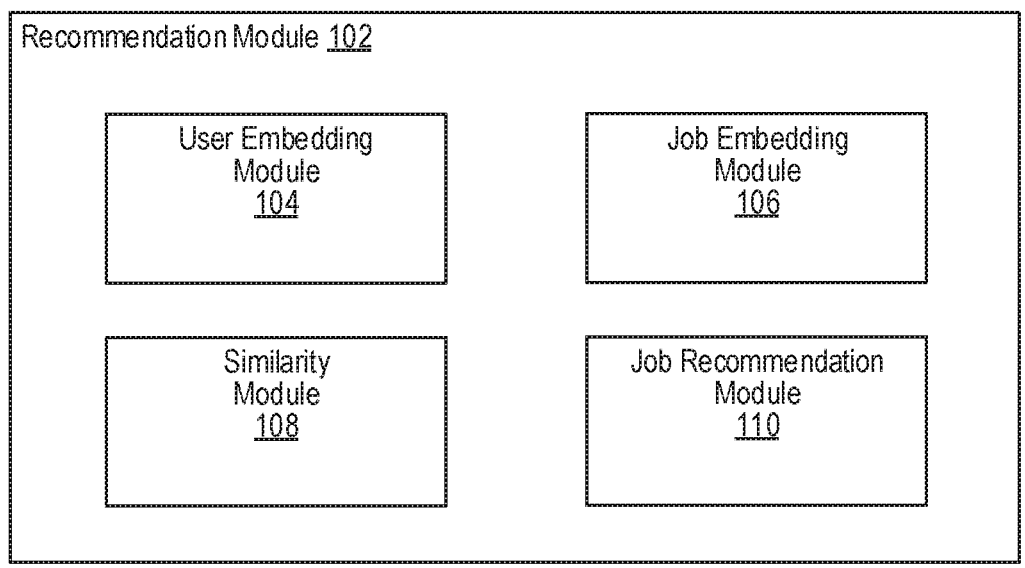
FIG. 1 illustrates an example system including an example recommendation module, according to an embodiment of the present technology.
Figure 1:
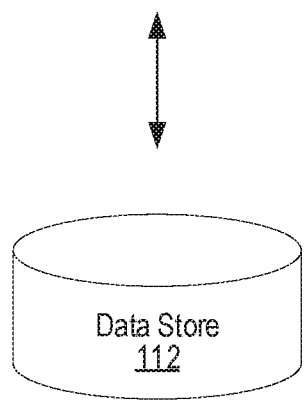

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Recommending Job Postings

Under conventional approaches, users can be recommended content based on various techniques. In some instances, users can be provided content based on their interests. For example, users that often access content items relating to a set of particular interests (e.g., cooking, travel, etc.) can be provided other content items that relate to those interests. However, such conventional approaches are generally not as effective when recommending other types of content such as job postings. For example, job postings by various organizations may be published through a content provider (e.g., social networking system). In general, a job posting may include various text and media (e.g., images, videos, etc.) describing the job. Under conventional approaches, the text in the job posting may be analyzed to identify keywords that reflect information such as roles and requirements of the job. Further, a user can provide information (e.g., resume, job history, etc.) that can be analyzed to determine keywords that reflect skills and capabilities of the user. The keywords associated with the user can be used to identify job postings that may be of interest to the user. For example, a user may be associated with keywords such as "software engineer", "python", and "machine learning". A job posting may be associated with keywords such as "cloud computing", "machine learning", "python", and "software engineer". In this example, the posting may be provided a recommendation to the user based on a threshold match between their respective keywords. Such conventional approaches have a number of drawbacks. For example, these conventional approaches can require users to provide information describing their employment history or at least their skills and capabilities. Further, these conventional approaches can lack sophistication in the manner in which they identify relevant job postings and can often result in recommendations that are rudimentary at best. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users can be provided recommendations for job postings. In some embodiments, candidate job postings to be recommended to a given user can be evaluated based on a comparison of a user embedding of the user and respective job embeddings of the job postings. In some embodiments, a content provider (e.g., social networking system) can determine the user embedding based on content associated with the user (e.g., content included in a profile of the user, content accessed by the user through the content provider, etc.). For example, a first portion of the user embedding can describe text embeddings corresponding to text included in content associated with the user (e.g., text included in the profile of the user, text included in content accessed by the user through the content provider, etc.). A second portion of the user embedding can describe media embeddings corresponding to media included in content associated with the user (e.g., media included in the profile of the user, media included in content accessed by the user through the content provider, etc.). A third portion of the user embedding can describe dense data including, for example, historical data describing identifiers of content items that were sequentially accessed by the user during various sessions. A job embedding for a job posting can be similarly arranged. For example, a first portion of the job embedding can describe text embeddings corresponding to text included in the job posting. A second portion of the job embedding can describe media embeddings corresponding to media (e.g., images, videos, etc.) included in the job posting. A third portion of the job embedding can describe dense data including, for example, a number of times the job posting was accessed by users, a number of times the job posting was shared by users, and a number of users that have applied to the job posting. In various embodiments, the user embedding and the job embedding can be evaluated to determine whether the job posting should be provided as a recommendation to the user. For example, the job posting can be provided as a recommendation to the user when a threshold similarity is determined between the user embedding and the job embedding. More details relating to the present technology are provided below.

FIG. 1 illustrates an example system 100 including an example recommendation module 102, according to an embodiment of the present technology. As shown in the example of FIG. 1, the recommendation module 102 can include a user embedding module 104, a job embedding module 106, a similarity module 108, and a job recommendation module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the recommendation module 102 or at least a portion thereof can be implemented using one or more computing devices or systems that include one or more servers, such as network servers or cloud servers. In some instances, the recommendation module 102 can, in part or in whole, be implemented within or configured to operate in conjunction with a social networking system (or service), such as the social networking system 630 of FIG. 6. In some instances, the recommendation module 102 can be, in part or in whole, implemented within or configured to operate in conjunction or be integrated with a client computing device, such as the user device 610 of FIG. 6. For example, the recommendation module 102 can be implemented as or within a dedicated application (e.g., app), a program, or an applet running on a user computing device or client computing system. The application incorporating or implementing instructions for performing some, or all, functionality of the recommendation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The recommendation module 102 can be configured to communicate and/or operate with the at least one data store 112, as shown in the example system 100. The at least one data store 112 can be configured to store and maintain various types of data. For example, the data store 112 can store information describing various content that has been shared by users of a social networking system. In some embodiments, the data store 112 can store information describing users, job postings, and corresponding embeddings for users and job postings. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The user embedding module 104 can be configured to generate user embeddings for users. In various embodiments, a user embedding for a user can include multiple portions that each describe some channel of information. For example, the user embedding can include a first portion corresponding to embeddings generated from text (e.g., text included in a profile of the user, text in content accessed by the user, etc.), a second portion corresponding to embeddings generated from media (e.g., media included in the profile of the user, media in content accessed by the user, etc.), and a third portion corresponding to embeddings generated from dense data (e.g., identifiers of content items that were sequentially accessed by the user). More details regarding the user embedding module 104 will be provided below with reference to FIG. 2.

The job embedding module 106 can be configured to generate embeddings for job postings. In various embodiments, a job embedding for a job posting can include multiple portions that each describe some channel of information. For example, the job embedding can include a first portion corresponding to embeddings generated from text included in the job posting, a second portion corresponding to embeddings generated from media included in the job posting, and a third portion corresponding to embeddings generated from dense data related to the job posting. More details regarding the job embedding module 106 will be provided below with reference to FIG. 3.

The similarity module 108 can be configured to determine a level of similarity between a user embedding of a user and a job embedding of a job posting. In some embodiments, the similarity module 108 can determine a dot product based on the user embedding and the job embedding to output a similarity score. In some embodiments, the similarity module 108 can apply a loss function (e.g., log loss function, parallelized loss function) to measure a prediction accuracy for job postings being recommended to users. For example, in some embodiments, the loss function can measure a prediction accuracy for a job posting recommended to a user based on a similarity score for the user and the job posting and a label (e.g., 0 or 1) indicating whether the user interacted with the recommended job posting. For example, the label can indicate that the user interacted with the job posting if the user views the job posting, shares the job posting with another user, or responds (or applies) to the job posting. The outputs from the loss function can be used to refine (or reweight) any machine learning models that are used to generate the user embedding and the job embedding.

The job recommendation module 110 can be configured to provide recommendations for job postings to users. In some embodiments, when determining whether to recommend a given job posting to a user, the job recommendation module 110 can determine whether a similarity score between an embedding for the user and an embedding for the job posting satisfies a threshold similarity value. If the threshold similarity value is satisfied, the job recommendation module 110 provides the job posting as a recommendation to the user. For example, the job posting can be provided as a recommendation through a content provider. In some embodiments, the recommendation is provided through a social networking system (e.g., the social networking system 630 of FIG. 6).

Figure 2:
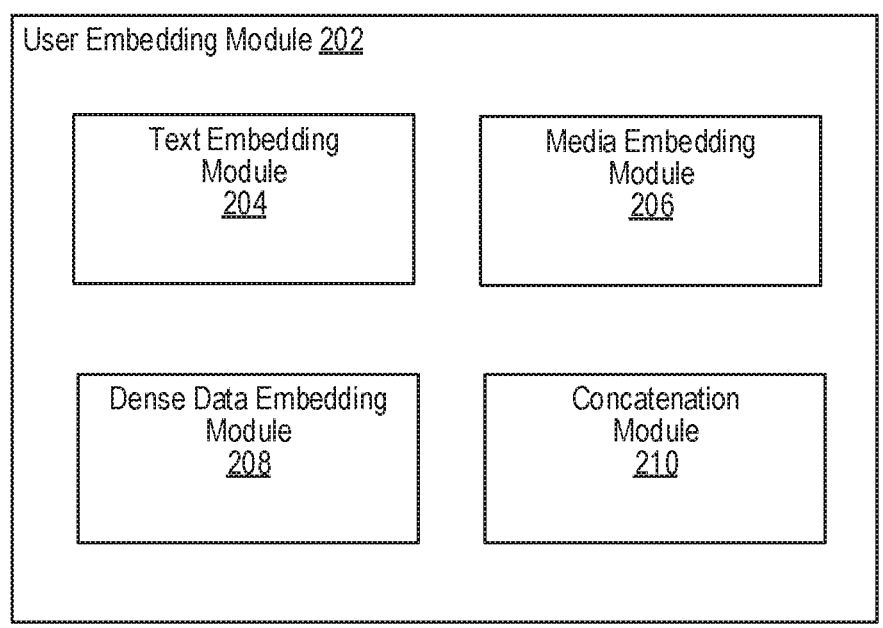
FIG. 2 illustrates an example user embedding module, according to an embodiment of the present technology.

FIG. 2 illustrates a user embedding module 202, according to an embodiment of the present technology. The user embedding module 202 can generate user embeddings for users of a content provider (e.g., the social networking system 630 of FIG. 6). In some embodiments, the user embedding module 104 of FIG. 1 can be implemented with the user embedding module 202. As shown in the example of FIG. 2, the user embedding module 202 can include a text embedding module 204, a media embedding module 206, a dense data embedding module 208, and a concatenation module 210. In various embodiments, a user embedding is composed of a first portion that corresponds to one or more text embeddings, a second portion that corresponds to one or more media embeddings, and a third portion that corresponds to one or more dense data embeddings. In such embodiments, the text embedding(s) can be determined by the text embedding module 204, the media embedding(s) can be determined by the media embedding module 206, and the dense data embedding(s) can be determined by the dense data embedding module 208, as described below.

The text embedding module 204 can be configured to generate text embeddings (or word embeddings). In general, a text embedding is a way of representing text where each word in a vocabulary is represented by a real valued vector in a high-dimensional vector space. The vectors are learned in such a way that words having similar meanings will have similar representations in the high-dimensional vector space. In some embodiments, the text embedding module 204 can generate text embeddings based on text describing features of a user. For example, the user may be associated with a user profile that describes various features such as employment history, education level, and other demographic data, to name some examples. In this example, the text embedding module 204 can generate text embeddings based on such information. In some embodiments, the text embedding module 204 can generate text embeddings based on text included in content that was accessed by the user. For example, the user may access content such as posts and pages through the content provider. Such content can include text (e.g., captions, comments, etc.) and media (e.g., images, videos, etc.). For example, a job posting accessed by the user may include text describing a corresponding job title, job description, and wage details. The job posting may also include one or more images. In this example, the text embedding module 204 can generate text embeddings from text associated with the job posting that was accessed by the user. In various embodiments, the text embedding module 204 can implement a machine learning model that is trained to determine text embeddings for text (e.g., words, terms). The machine learning model can be any conventional embedding model for generating text embeddings (or word embeddings). In some embodiments, the machine learning model includes a combination of at least an embedding layer, a convolutional neural network layer, and a plurality of multilayer perceptron layers. The embedding layer can determine embeddings for tokenized and one-hot encoded words in the text based on a dictionary. In such embodiments, embeddings determined by the embedding layer are provided to the convolutional neural network layer which applies one or more convolutions to the embeddings. The convolved embeddings outputted by the convolutional neural network layer can be provided to the plurality of multilayer perceptron layers for concatenation. The concatenated embeddings together represent a text embedding that corresponds to a first portion of a user embedding for the user.

The media embedding module 206 can be configured to generate media embeddings (e.g., image embeddings). In general, a media embedding (e.g., image embedding) is a way of representing media (e.g., an image) where each media is represented by a real valued vector in a high-dimensional vector space. The vectors are learned in such a way that visually similar media will have similar representations in the high-dimensional vector space. In various embodiments, the media embedding module 206 can generate media embeddings based on media included in content that was accessed by the user. For example, the user may access content such as posts and pages through the content provider. Such content can include text (e.g., captions, comments, etc.) and media (e.g., images, videos, etc.). For example, a job posting accessed by the user may include text describing a corresponding job title, job description, and wage details. The job posting may also include one or more images. In this example, the media embedding module 206 can generate media embeddings from the images associated with the job posting. In various embodiments, the media embedding module 206 can implement a machine learning model that is trained to determine media embeddings. The machine learning model can be any conventional embedding model for generating media embeddings (e.g., image embeddings). In some embodiments, the machine learning model includes a combination of at least a convolutional neural network layer and a plurality of multilayer perceptron layers. The convolutional neural network layer can apply one or more convolutions to inputted media (e.g., an image) to determine a corresponding feature vector that includes information describing the media. For example, the feature vector can include information for classifying the media and/or one or more objects represented in the media. The feature vectors outputted by the convolutional neural network layer can be provided to the plurality of multilayer perceptron layers for concatenation. The concatenated embeddings together represent a media embedding that corresponds to a second portion of the user embedding for the user.

The dense data embedding module 208 can be configured to generate dense data embeddings. In general, a dense data embedding is a way of representing dense data using a real valued vector in a high-dimensional vector space. The vectors are learned in such a way that similar dense data will have similar representations in the high-dimensional vector space. In various embodiments, the dense data embedding module 208 can generate dense data embeddings based on dense data associated with the user. For example, in some embodiments, dense data embeddings can be generated from a list of identifiers corresponding to content items (e.g., posts, pages, etc.) that were sequentially accessed by the user over one or more login sessions. For example, the user may access various posts and pages that relate to specific industries or organizations. In another example, the user may access various job postings through the content provider. In various embodiments, the dense data embedding module 208 can implement a machine learning model that is trained to determine dense data embeddings. The machine learning model can be any conventional embedding model for generating dense data embeddings. In some embodiments, the machine learning model includes a recurrent neural network layer for processing sequentially ordered data (e.g., identifiers associated with sequentially accessed content items) and a plurality of multilayer perceptron layers. The recurrent neural network layer can implement a plurality of long-short term memory layers (or LSTMs) that sequentially process the dense data (e.g., content item identifiers). The recurrent neural network layer can output a respective embedding for each inputted identifier. The embeddings outputted by the recurrent neural network layer can be provided to the plurality of multilayer perceptron layers for concatenation. The concatenated embeddings together represent a dense data embedding that corresponds to a third portion of the user embedding for the user. Other types of dense data may be used to generate dense data embeddings. For example, in some embodiments, embeddings can be generated based on a number of times the user viewed a job posting, a number of times the user applied to a job posting, and a number of times the user shared a job posting with other users. Many variations are possible.

The concatenation module 210 can be configured to concatenate the text embedding(s) corresponding to the first portion of the user embedding, media embedding(s) corresponding to the second portion of the user embedding, and dense data embedding(s) corresponding to the third portion of the user embedding, as determined above. In various embodiments, the concatenation module 210 implements one or more multilayer perceptron layers that concatenate the text embedding(s), media embedding(s), and dense data embedding(s) to produce the user embedding for the user.

Figure 3:
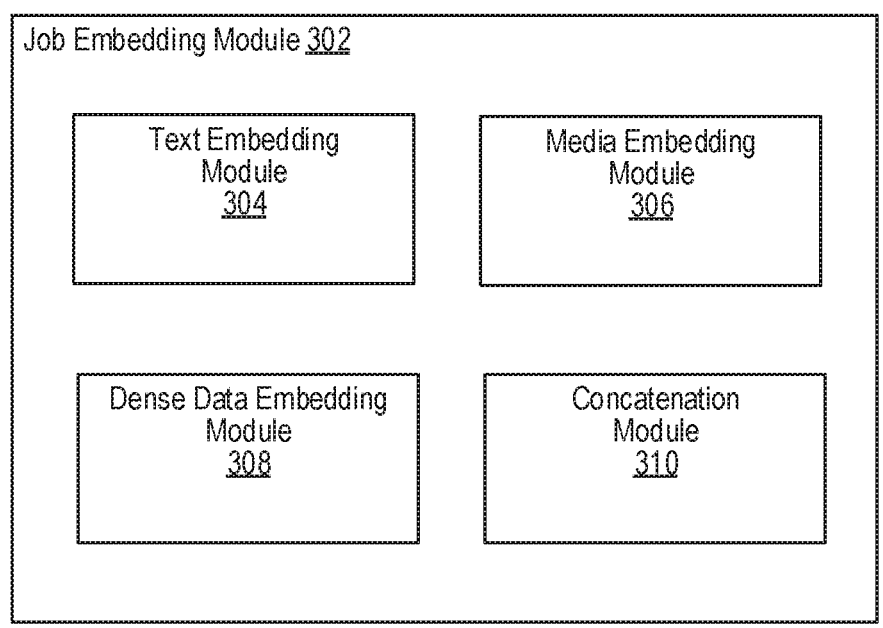
FIG. 3 illustrates an example job embedding module, according to an embodiment of the present technology.

FIG. 3 illustrates a job embedding module 302, according to an embodiment of the present technology. The job embedding module 302 can generate job embeddings for job postings published through a content provider (e.g., the social networking system 630 of FIG. 6). In some embodiments, the job embedding module 106 of FIG. 1 can be implemented with the job embedding module 302. As shown in the example of FIG. 3, the job embedding module 302 can include a text embedding module 304, a media embedding module 306, a dense data embedding module 308, and a concatenation module 310. In various embodiments, a job embedding is composed of a first portion that corresponds to one or more text embeddings, a second portion that corresponds to one or more media embeddings, and a third portion that corresponds to one or more dense data embeddings. In such embodiments, the text embedding(s) can be determined by the text embedding module 304, the media embedding(s) can be determined by the media embedding module 306, and the dense data embedding(s) can be determined by the dense data embedding module 308, as described below.

The text embedding module 304 can be configured to generate text embeddings (or word embeddings). In some embodiments, the text embedding module 304 can generate text embeddings based on text included in a job posting for which a job embedding is determined. For example, the job posting may include text describing a corresponding job title, job description, and wage details. The job posting may also include one or more images. In this example, the text embedding module 304 can generate text embeddings from text associated with the job posting. In various embodiments, the text embedding module 304 can implement a machine learning model that is trained to determine text embeddings for text (e.g., words, terms). The machine learning model can be any conventional embedding model for generating text embeddings (or word embeddings). In some embodiments, the machine learning model includes a combination of at least an embedding layer, a convolutional neural network layer, and a plurality of multilayer perceptron layers. The embedding layer can determine embeddings for tokenized and one-hot encoded words in the text based on a dictionary. In such embodiments, embeddings determined by the embedding layer are provided to the convolutional neural network layer which applies one or more convolutions to the embeddings. The convolved embeddings outputted by the convolutional neural network layer can be provided to the plurality of multilayer perceptron layers for concatenation. The concatenated embeddings together represent a text embedding that corresponds to a first portion of the job embedding for the job posting.

The media embedding module 306 can be configured to generate media embeddings (e.g., image embeddings). In various embodiments, the media embedding module 306 can generate media embeddings based on media included in the job posting for which the job embedding is being determined. For example, the job posting may include text describing a corresponding job title, job description, and wage details. The job posting may also include one or more images. In this example, the media embedding module 306 can generate media embeddings from the images associated with the job posting. In various embodiments, the media embedding module 306 can implement a machine learning model that is trained to determine media embeddings. The machine learning model can be any conventional embedding model for generating media embeddings (e.g., image embeddings). In some embodiments, the machine learning model includes a combination of at least a convolutional neural network layer and a plurality of multilayer perceptron layers. The convolutional neural network layer can apply one or more convolutions to inputted media (e.g., an image) to determine a corresponding feature vector that includes information describing the media. For example, the feature vector can include information for classifying the media and/or one or more objects represented in the media. The feature vectors outputted by the convolutional neural network layer can be provided to the plurality of multilayer perceptron layers for concatenation. The concatenated embeddings together represent a media embedding that corresponds to a second portion of the job embedding.

The dense data embedding module 308 can be configured to generate dense data embeddings. In various embodiments, the dense data embedding module 308 can generate dense data embeddings based on dense data associated with the job posting for which the job embedding is being determined. For example, in some embodiments, dense data embeddings can be generated based on features describing users that have applied to the job posting (e.g., employment history, education level, and other demographic data). In various embodiments, the dense data embedding module 308 can implement a machine learning model that is trained to determine dense data embeddings. The machine learning model can be any conventional embedding model for generating dense data embeddings. In some embodiments, the machine learning model includes a convolutional neural network layer and a plurality of multilayer perceptron layers. The embeddings outputted by the convolutional neural network layer can be provided to the plurality of multilayer perceptron layers for concatenation. The concatenated embeddings together represent a dense data embedding that corresponds to a third portion of the job embedding. Many variations are possible.

The concatenation module 310 can be configured to concatenate the text embedding(s) corresponding to the first portion of the job embedding, media embedding(s) corresponding to the second portion of the job embedding, and dense data embedding(s) corresponding to the third portion of the job embedding, as determined above. In various embodiments, the concatenation module 310 implements one or more multilayer perceptron layers that concatenate the text embedding(s), media embedding(s), and dense data embedding(s) to produce the job embedding for the job posting.

Figure 4A:
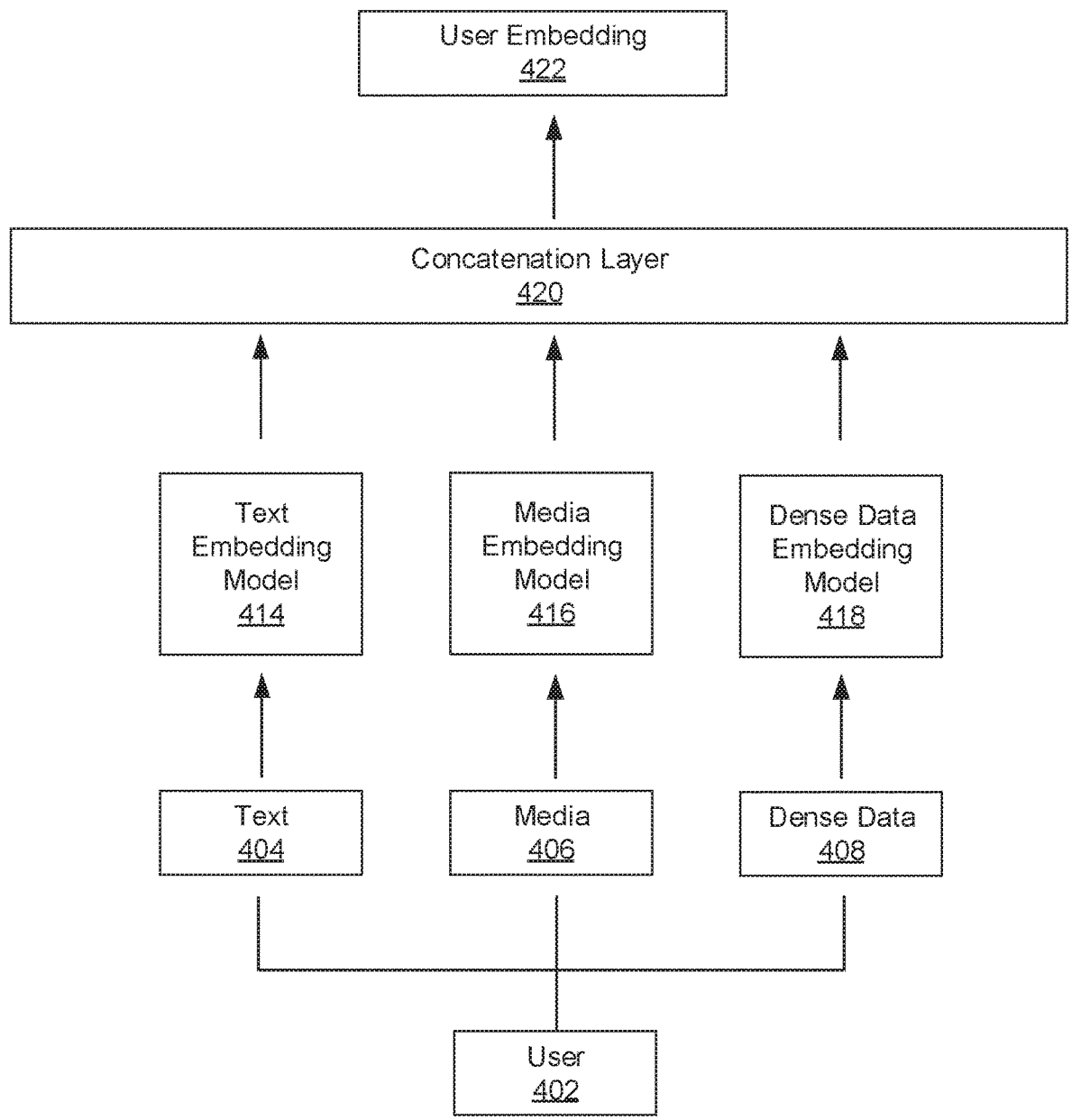
FIGS. 4A-4B illustrate example diagrams, according to an embodiment of the present technology.

FIG. 4A illustrates an example diagram 400 of a model for generating user embeddings. The model can generate a user embedding 422 for a user 402. For example, in some embodiments, the user embedding 422 can be generated based on various user profile features associated with the user 402. In some embodiments, the user embedding 422 can be generated based on various content accessed by the user 402 through a content provider (e.g., the social networking system 630 of FIG. 6). In some embodiments, text 404 associated with the user 402 (e.g., text included in user profile data, content accessed by the user, etc.) can be provided to a text embedding model 414 to determine corresponding text embeddings, as described above. In some embodiments, media 406 associated with the user 402 (e.g., media included in user profile data, content accessed by the user, etc.) can be provided to a media embedding model 416 to determine corresponding media embeddings, as described above. In some embodiments, dense data 408 associated with the user 402 (e.g., content accessed sequentially by the user, etc.) can be provided to a dense data embedding model 418 to determine corresponding dense data embeddings, as described above. A concatenation layer 420 can concatenate the generated text embedding(s), media embedding(s), and dense data embedding(s) to produce the user embedding 422.

Figure 4B:
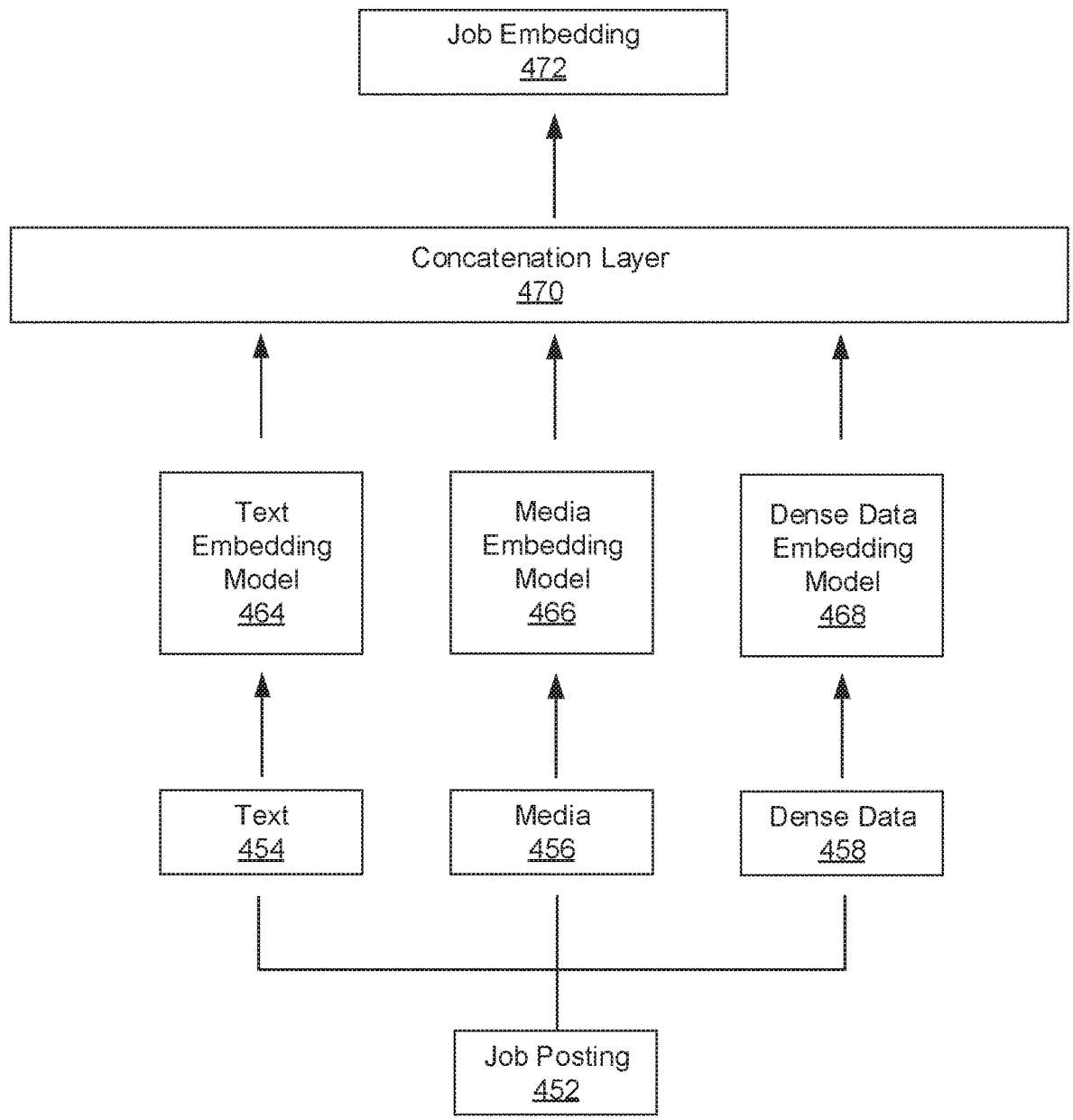

FIG. 4B illustrates an example diagram 450 of a model for generating job embeddings. The model can generate a job embedding 472 for a job posting 452. For example, in some embodiments, the job embedding 472 can be generated based on various features associated with the job posting 452. In some embodiments, text 454 associated with the job posting 452 can be provided to a text embedding model 464 to determine corresponding text embeddings, as described above. In some embodiments, media 456 associated with the job posting 452 can be provided to a media embedding model 466 to determine corresponding media embeddings, as described above. In some embodiments, dense data 458 associated with the job posting 452 can be provided to a dense data embedding model 468 to determine corresponding dense data embeddings, as described above. A concatenation layer 470 can concatenate the generated text embedding(s), media embedding(s), and dense data embedding(s) to produce the job embedding 472.

Figure 5:
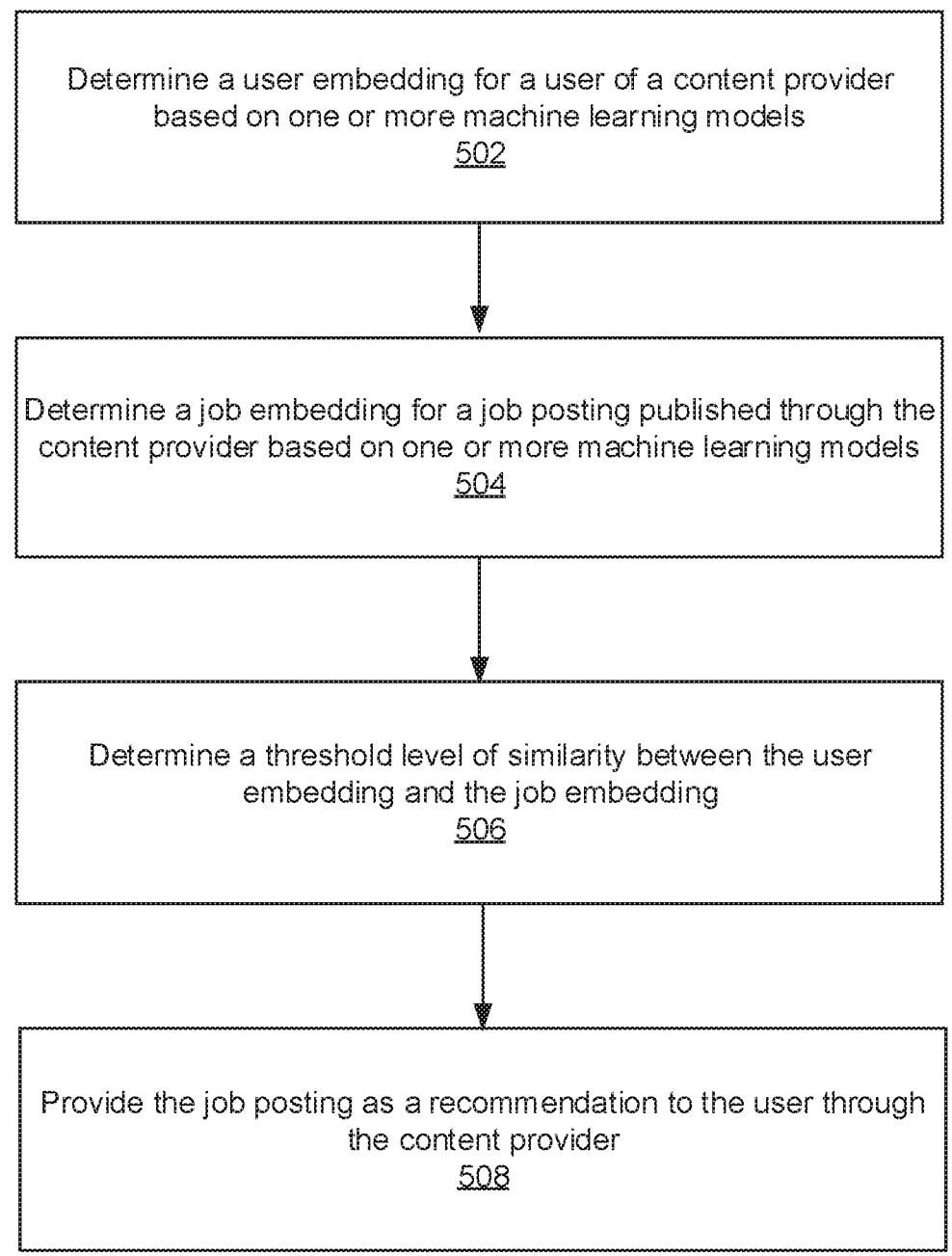
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, a user embedding for a user of a content provider can be determined based on one or more machine learning models. At block 504, a job embedding for a job posting published through the content provider can be determined based on one or more machine learning models. At block 506, a determination can be made of a threshold level of similarity between the user embedding and the job embedding. At block 508, the job posting can be provided as a recommendation to the user through the content provider.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
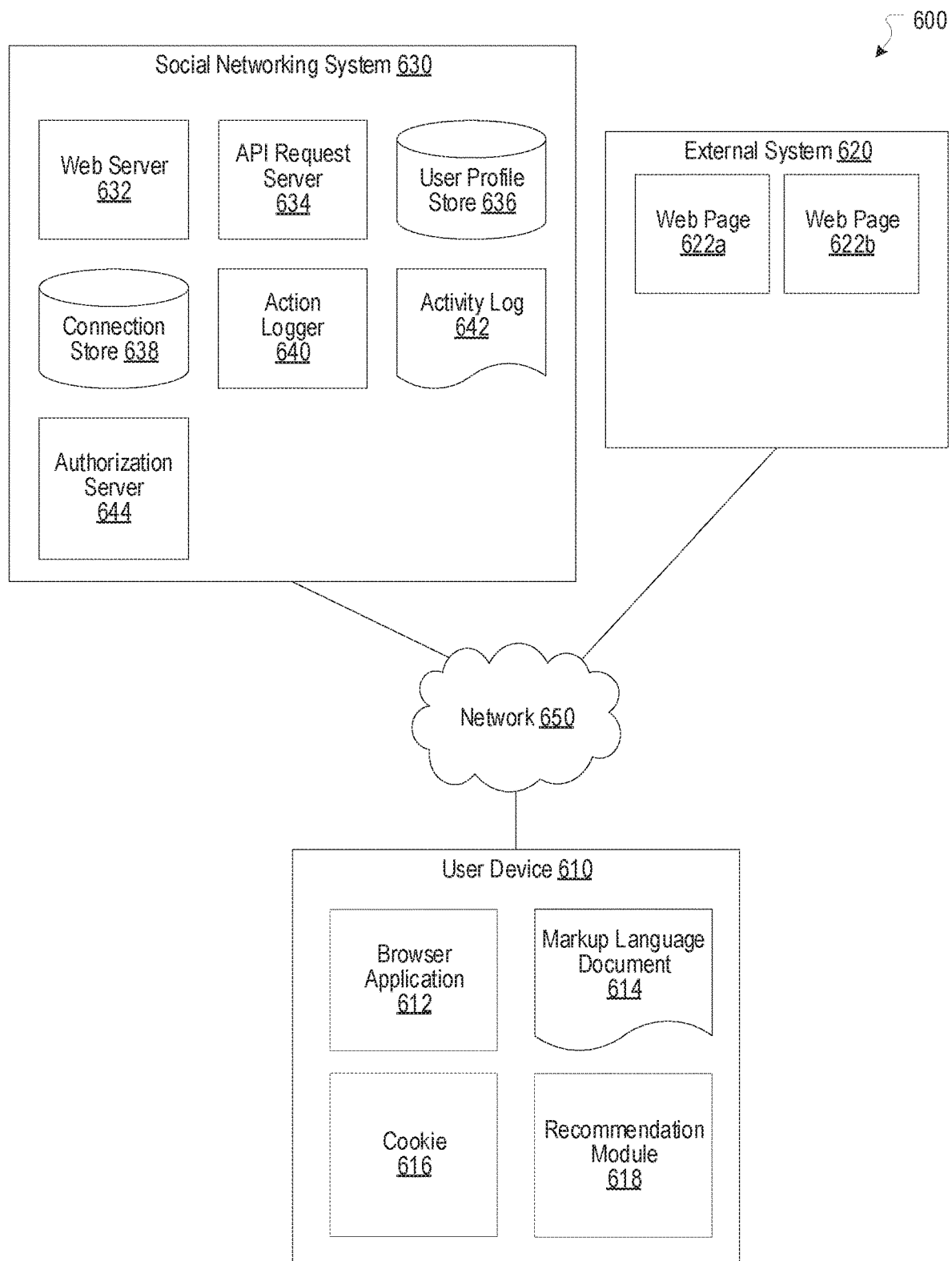
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610. The user device 610 can include a recommendation module 618. In some embodiments, the recommendation module 618 can be implemented as the recommendation module 102 of FIG. 1.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a recommendation module. The recommendation module, for example, can be implemented as some or all of the functionality of the recommendation module 102 of FIG. 1. As discussed previously, it should be appreciated that there can be many variations or other possibilities.

Hardware Implementation

Figure 7:
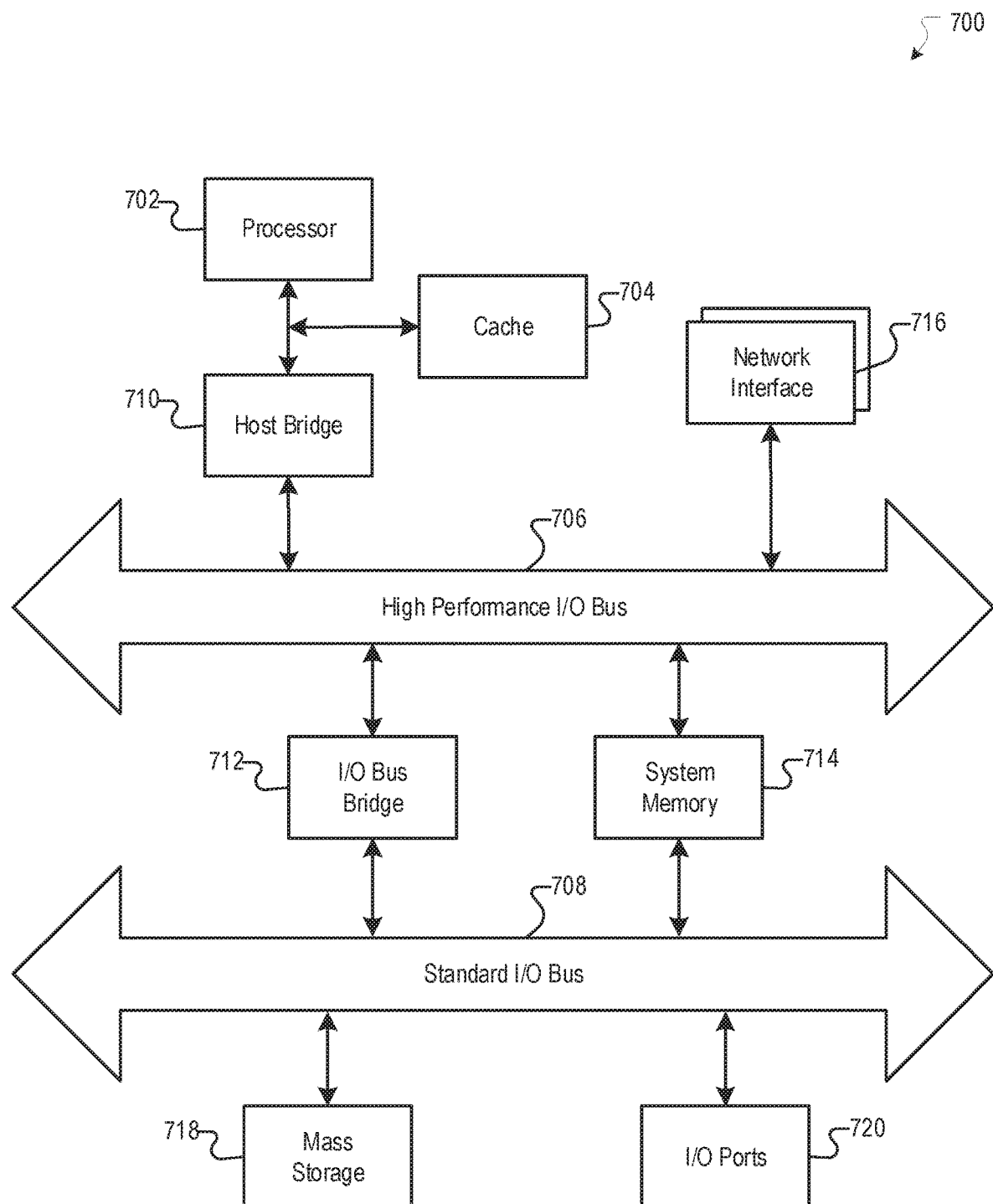
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
applying, by a computing system, one or more machine learning models to generate a user embedding for a user of a content provider, the user embedding based at least in part on i) a user profile of the user and ii) content associated with an organization that was accessed by the user;
applying, by the computing system, one or more machine learning models to generate a job embedding for a job posting published through the content provider, wherein
the job embedding comprises at least a first portion corresponding to a text embedding, a second portion corresponding to a media embedding, and a third portion corresponding to a data embedding,
the media embedding is generated based at least in part on media included in the job posting, the media including an image, and
the data embedding is generated based at least in part on a number of times the job posting was accessed by users, a number of times the job posting was shared by users, and a number of users that have applied to the job posting;
determining, by the computing system, a threshold level of similarity between the user embedding and the job embedding; and
providing, by the computing system, the job posting as a recommendation to the user through the content provider.

2. The computer-implemented method of claim 1, wherein the user embedding for the user comprises at least a first portion corresponding to a text embedding, a second portion corresponding to a media embedding, and a third portion corresponding to a data embedding.

3. The computer-implemented method of claim 2, wherein the text embedding of the user embedding is generated based at least in part on text included in a user profile of the user and the text included in content that was accessed by the user.

4. The computer-implemented method of claim 2, wherein the media embedding of the user embedding is generated based at least in part on media included in a user profile of the user, media included in content that was accessed by the user, or both.

5. The computer-implemented method of claim 2, wherein the data embedding of the user embedding is generated based at least in part on a set of identifiers corresponding to content items that were sequentially accessed by the user over one or more sessions.

6. The computer-implemented method of claim 1, wherein the text embedding of the job embedding is generated based at least in part on text included in the job posting.

7. The computer-implemented method of claim 1, wherein determining the threshold level of similarity between the user embedding and the job embedding further comprises:
determining, by the computing system, a similarity score based on a dot product of the user embedding and the job embedding; and
determining, by the computing system, that the similarity score satisfies a threshold value.

8. The computer-implemented method of claim 1, wherein the text embedding of the user embedding is generated by a first machine learning model, the media embedding of the user embedding is generated by a second machine learning model, and the data embedding of the user embedding is generated by a third machine learning model, the third machine learning model including a recurrent neural network layer for processing sequentially ordered data.

9. A system comprising:
at least one processor; and
a memory storing instructions that, when executed by the at least one processor, cause the system to perform:
applying one or more machine to generate a user embedding for a user of a content provider, the user embedding based at least in part on i) a user profile of the user and ii) content associated with an organization that was accessed by the user;
applying one or more machine learning models to generate a job embedding for a job posting published through the content provider, wherein
the job embedding comprises at least a first portion corresponding to a text embedding, a second portion corresponding to a media embedding, and a third portion corresponding to a data embedding,
the media embedding is generated based at least in part on media included in the job posting, the media including an image, and
the data embedding is generated based at least in part on a number of times the job posting was accessed by users, a number of times the job posting was shared by users, and a number of users that have applied to the job posting;
determining a threshold level of similarity between the user embedding and the job embedding; and
providing the job posting as a recommendation to the user through the content provider.

10. The system of claim 9, wherein the user embedding for the user comprises at least a first portion corresponding to a text embedding, a second portion corresponding to a media embedding, and a third portion corresponding to a data embedding.

11. The system of claim 10, wherein the text embedding of the user embedding is generated based at least in part on text included in a user profile of the user and the text included in content that was accessed by the user.

12. The system of claim 10, wherein the media embedding of the user embedding is generated based at least in part on media included in a user profile of the user, media included in content that was accessed by the user, or both.

13. The system of claim 10, wherein the data embedding of the user embedding is generated based at least in part on a set of identifiers corresponding to content items that were sequentially accessed by the user over one or more sessions.

14. The system of claim 9, wherein the text embedding of the user embedding is generated by a first machine learning model, the media embedding of the user embedding is generated by a second machine learning model, and the data embedding of the user embedding is generated by a third machine learning model, the third machine learning model including a recurrent neural network layer for processing sequentially ordered data.

15. A non-transitory computer-readable storage medium including instructions that, when executed by at least one processor of a computing system, cause the computing system to perform a method comprising:
applying one or more machine learning models to generate a user embedding for a user of a content provider, the user embedding based at least in part i) a user profile of the user and ii) content associated with an organization that was accessed by the user;

applying one or more machine learning models to generate a job embedding for a job posting published through the content provider, wherein the job embedding comprises at least a first portion corresponding to a text embedding, a second portion corresponding to a media embedding, and a third portion corresponding to a data embedding, the media embedding is generated based at least in part on media included in the job posting, the media including an image, and the data embedding is generated based at least in part on a number of times the job posting was accessed by users, a number of times the job posting was shared by users, and a number of users that have applied to the job posting;

determining a threshold level of similarity between the user embedding and the job embedding; and providing the job posting as a recommendation to the user through the content provider.

16. The non-transitory computer-readable storage medium of claim 15, wherein the user embedding for the user comprises at least a first portion corresponding to a text embedding, a second portion corresponding to a media embedding, and a third portion corresponding to a data embedding.

17. The non-transitory computer-readable storage medium of claim 16, wherein the text embedding of the user embedding is generated based at least in part on text included in a user profile of the user and the text included in content that was accessed by the user.

18. The non-transitory computer-readable storage medium of claim 16, wherein the media embedding of the user embedding is generated based at least in part on media included in a user profile of the user, media included in content that was accessed by the user, or both.

19. The non-transitory computer-readable storage medium of claim 16, wherein the data embedding of the user embedding is generated based at least in part on a set of identifiers corresponding to content items that were sequentially accessed by the user over one or more sessions.

20. The non-transitory computer-readable storage medium of claim 15, wherein the text embedding of the user embedding is generated by a first machine learning model, the media embedding of the user embedding is generated by a second machine learning model, and the data embedding of the user embedding is generated by a third machine learning model, the third machine learning model including a recurrent neural network layer for processing sequentially ordered data.

* * * * *